United States Patent [19]

Heinemann et al.

[11] Patent Number: 6,046,779
[45] Date of Patent: Apr. 4, 2000

[54] CIRCUIT ARRANGEMENT FOR PHASE SHIFTING A COLOR SIGNAL PRIOR TO COMB FILTERING AND THEN CANCELLING THE PHASE SHIFT AFTER COMB FILTERING

[75] Inventors: Herbert Heinemann, Pinneberg, Germany; Shin-Ichi Uchiyama, Osaka, Japan

[73] Assignee: U.S. Philips Corporation, New York, N.Y.

[21] Appl. No.: 09/062,944

[22] Filed: Apr. 20, 1998

[30] Foreign Application Priority Data

Apr. 25, 1997 [DE] Germany .............................. 197 17 553
Jul. 17, 1997 [DE] Germany .............................. 197 30 619

[51] Int. Cl.$^7$ .............................. H04N 9/64; H04N 9/79
[52] U.S. Cl. ...................... 348/708; 348/654; 348/659; 386/25; 386/41
[58] Field of Search .................................. 348/708, 653, 348/654, 659, 660, 665, 667; 386/22, 24, 25, 26, 28, 35, 41, 44; H04N 9/64, 9/83, 9/79

[56] References Cited

U.S. PATENT DOCUMENTS 5,802,238  9/1998  Heinemann ................................ 386/25

FOREIGN PATENT DOCUMENTS

0752791A2  8/1997  European Pat. Off. .

*Primary Examiner*—Sherrie Hsia
*Attorney, Agent, or Firm*—Edward W. Goodman

[57] ABSTRACT

A circuit arrangement processes a color signal reproduced from a record carrier, preferably a video tape, and modulated on a carrier wave of a first carrier frequency (color-under signal). The color signal modulated on the first carrier frequency is applied to a first mixer which converts the color signal to a second carrier frequency by mixing it with a first mixing signal. An output signal of the first mixer is applied to a comb filter circuit, whose output signal is applied to a second mixer. The second mixer converts the comb-filtered signal to a third carrier frequency by mixing it with a second mixing signal, in order to achieve an optimum comb filtering. The first mixing signal is subjected to a phase shift of a given magnitude by a first phase shifter after a given number of picture lines of the color signal. Each phase shift is in addition to the previously applied phase shifts and is selected so as to compensate for the possible non-integral ratio between the period of one picture line and the period of the color signal modulated on the first carrier frequency, in such a manner that a period of the color carrier wave on the input of the comb filter circuit begins at the beginning of the next picture line. A second phase shifter subjects the second mixing signal to a phase shift of the same magnitude but of opposite sign at the same instants.

8 Claims, 1 Drawing Sheet

CIRCUIT ARRANGEMENT FOR PHASE SHIFTING A COLOR SIGNAL PRIOR TO COMB FILTERING AND THEN CANCELLING THE PHASE SHIFT AFTER COMB FILTERING

BACKGROUND OF THE INVENTION

1. Field of the Invention the invention relates to a circuit arrangement for processing a color signal reproduced from a record carrier, preferably a video tape, and modulated on a carrier wave of a first carrier frequency (color-under signal), in which circuit arrangement the color signal modulated on the first carrier frequency being applied to a first mixer which converts the color signal to a second carrier frequency by mixing it with a first mixing signal and whose output signal is applied to a comb filter circuit, the output signal of the comb filter circuit being applied to a second mixer which converts the comb-filtered signal to a third carrier frequency by mixing it with a second mixing signal.

2. Description of the Related Art

European Patent EP-A-0 752 791, corresponding to U.S. Pat. No. 5,802,238, discloses a circuit arrangement by which a color signal, reproduced from a record carrier, particularly a video tape, and modulated on a carrier wave of a first carrier frequency, is comb-filtered and the color carrier frequency is converted to a frequency in accordance with a reproduction standard of the color signal. For. example, in the case of the VHS standard, the color signal is modulated on a color carrier having a frequency of 625 kHz when it is recorded on the tape. In the case of, for example, the NTSC standard, this signal should be re-converted to the color carrier frequency of 3.58 MHz. In addition to this conversion of the color carrier frequency, this known circuit arrangement performs a comb filtering. A first mixer has been provided, which converts the color carrier frequency to an intermediate value at which comb filtering is effected. After comb filtering, the conversion to the color carrier frequency in accordance with the reproduction standard is effected by means of a second mixing process. Comb filtering is effected to suppress the effect of crosstalk from adjacent tracks on the record carrier. By means of the two mixers, it is achieved that comb filtering is effected within the frequency-controlled and phase-controlled range of the circuit arrangement and, moreover, that the circuit complexity remains low because the color signal is still available with a carrier frequency below the carrier frequency required for reproduction.

In this circuit arrangement, as in other circuit arrangements in which comb filtering is effected at other frequencies, the problem arises that the period of the carrier wave on which the color signal is modulated, is not an integral multiple of the duration of one picture line of the color signal. As a result of this, the problem arises that comb filtering is effected with color carrier waves which are shifted in time with respect to one another, i.e., the color carrier waves of the picture lines to be filtered are phase-shifted with respect to each other during comb filtering. This prevents an optimum filtering. The problem that the period of the color carrier is not an integral multiple of the line period, occurs for all three carrier frequencies.

SUMMARY OF THE INVENTION

It is an object of the invention to provide a circuit arrangement of the type defined in the opening paragraph, in which this problem has been eliminated.

According to the invention, this object is achieved in that the first mixing signal is subjected to a phase shift of a given magnitude by a first phase shifter after a given number of picture lines of the color signal, the phase shift being, each time, effected in addition to the previously applied phase shifts and being selected so as to compensate for the possible non-integral ratio between the period of one picture line and the period of the color signal modulated on the first carrier frequency, in such a manner that a period of the color carrier wave on the input of the comb filter circuit begins at the beginning of the next picture line, and a second phase shifter subjects the second mixing signal to a phase shift of the same magnitude but of opposite sign at the same instants.

In a circuit arrangement in accordance with the invention, the two mixers are used not only for the conversion of the color carrier frequency but, in conjunction with two phase shifters, they are also used for effecting a phase shift of the color carrier wave in that part of the circuit arrangement which includes the comb filter circuit. Since the comb filter is arranged between the two mixers, it is advantageous to effect the phase shift by means of the first mixer, and to cancel it by means of the second mixer for the correct reproduction of the color signal.

For this purpose, the first mixing signal is subjected to a phase shift of a given magnitude by a first phase shifter after a given number of picture lines of the color signal, this number depending on the color signal standard. This given magnitude depends, in turn, on the standard of the color signal. As a result of this phase shift of the mixing signal, the output signal supplied by the first mixer also undergoes such a phase shift. The given number of picture lines and the given magnitude of the phase shift are then selected in such a manner that the color carrier waves at the beginning of the picture lines are in phase when they reach the comb filter circuit. Thus, it is achieved that the color signal modulated on the color carrier is comb filtered with the correct phase relationship in the comb filter circuit. In this way, an optimum comb filtering is obtained.

In order to achieve that the output signal of the circuit arrangement does not exhibit similar phase shifts, the second mixing signal is subjected to inverse phase shifts by a second phase shifter at the same instants. In this way, the phase shifts effected in the first mixer are canceled by the second mixer at the instants at which these are effected in the first mixer. Thus, the output signal is again free of phase shifts and can be reproduced in a disturbance-free manner.

The phase shift described above, which is effected by means of the first phase shifter in the first mixer and which is canceled in the second mixer, is carried out additionally after the given number of picture lines. For example, if, after a given number of picture lines, a phase shift of 90 degrees is applied, the phase shift is, each time, incremented by 90 degrees after the given number. After the given number of picture lines, the phase shift is, each time, advanced by 90 degrees, so that eventually the phase shift is 90 degrees, 180 degrees, 270 degrees, etc., the phase shift being incremented, each time, after the given number of picture lines has occurred.

This makes it possible to achieve an optimum comb filtering by means of the comb filter circuit with color carrier signals in the correct phase relationship, without the phase shift causing any undesirable effects in the output signal.

The given magnitude of the additional phase shift applied, each time, after a given number of picture lines is advantageously selected in such a manner, in which a period of the color carrier wave associated with a given pixel of the picture line, preferably the first active pixel of the picture line, begins at the beginning of the next picture line, that the color carrier waves of pixels which each time have the same position within the picture lines are filtered by the comb filter circuit in the proper phase relationship. Preferably, the periods of the color carrier waves of the respective first active pixels of the picture lines are phase-corrected so as to allow optimum comb-filtering.

By means of the further embodiment, it is achieved that the applied phase shifts, which eventually do not produce a phase shift but which could give rise to disturbances in the transition periods, are effected during time intervals in which the picture lines have no picture content, thereby assuring that at any rate no disturbances can occur in the active picture information.

For this purpose, those time intervals in which the horizontal synchronization pulses occur in the picture lines are particularly suitable.

For the NTSC standard the afore-mentioned given number of picture lines is one picture line. After each picture line the, first mixing signal, and thus of the output signal of the first mixer, is subjected to an additional phase shift of +90 degrees. Thus, at the beginning of each picture line, the phase shift is incremented by +90 degrees. The phase shift is canceled in a corresponding manner by means of the second mixer. With these values, the above-mentioned optimum comb filtering is achieved in the case of a signal in accordance with the NTSC standard.

These values, after which a phase shift of +90 degrees is effected by means of the first mixer, are two picture lines for a color signal in accordance with the PAL standard.

Circuit arrangements which have only one mixer, in which arrangements comb filtering is therefore effected either at the color carrier frequency with which the color signal has been recorded or at the color carrier frequency which corresponds to the reproduction standard, generally include a mixer to which the reproduced color signal is applied and which serves to cancel tape-recorded phase shifts of the color signal. Depending on the recording standard, various phase shifts of the color signal have been provided in order to reduce crosstalk effects on the tape. As a rule, this requires, at any rate, a mixer to cancel these tape-recorded phase shifts. The first mixer of the arrangement in accordance with the invention can therefore be used both for the phase shifts of the color signal applied in accordance with the invention in order to optimize the comb filtering and for canceling the recorded phase shifts. Thus, the first mixer produces two effects, so that the circuit arrangement in accordance with the invention requires hardly any additional circuit elements for the optimum comb filtering.

BRIEF DESCRIPTION OF THE DRAWING

An embodiment of the invention will be described in more detail hereinafter, by way of example, with reference to the drawing, in which.

DESCRIPTION OF THE PREFERRED EMBODIMENTS

Figure 1:
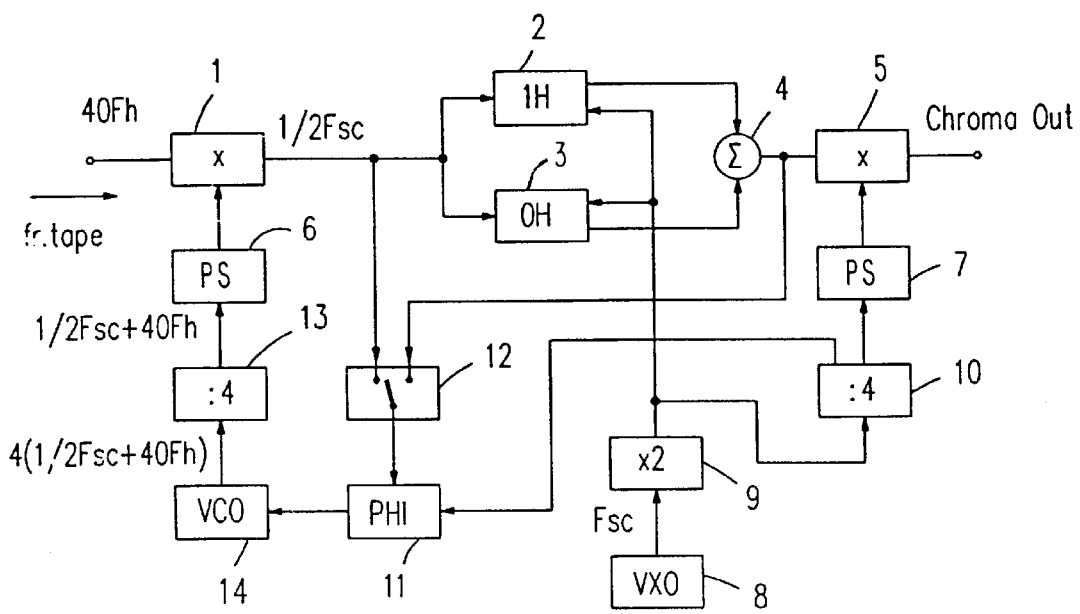
FIG. 1 of the drawing shows a block diagram of a circuit arrangement in accordance with the invention for the conversion and comb filtering of a signal in accordance with the NTSC standard.

As in most recording standards, for example, also the VHS standard, the signal is recorded on the tape with a so-called color-under color-carrier frequency. This means that the frequency of the color carrier lies below the carrier frequency for the luminance signal. The color signal is consequently recorded with a color carrier wave having a comparatively low frequency of 625 kHz. At the reproduction side, it should, therefore, be converted to the color carrier frequency which complies with the reproduction standard. In the example shown in FIG. 1, it has been assumed that the reproduction standard is the NTSC standard. The circuit arrangement should therefore convert the color carrier frequency of 625 kHz to 3.576 MHz in accordance with the NTSC standard. Moreover, a comb filtering is applied which suppresses crosstalk effects of the color signals from adjacent tracks on the tape. This comb filtering only has an optimum effect if the color carrier waves of the picture lines to be filtered are applied to the comb filter circuit in the correct phase relationship.

In FIG. 1, the color signal which has been reproduced from a record carrier is applied to a first mixer 1. In accordance with the recording standard in the present example, the color carrier frequency is 40 times the horizontal frequency of the color signal. By means of the first mixer, the color carrier frequency is converted to half the value in accordance with the reproduction standard, which is designated ½ Fsc in the FIG. 1. The output signal of the first mixer 1 is applied to a comb filter circuit, which comprises two delay elements 2 and 3 and a summing stage 4. The first delay element provides a delay equal to the duration of one picture line and the second delay element does not provide any delay. The second delay element serves to ensure that the color signal is subjected to the same amplitude and phase variations as in the first delay element 2.

The output signal of the summing stage 4 of the comb filter circuit is applied to a second mixer 5, by means of which the color carrier frequency is converted to the color carrier frequency in accordance with the reproduction standard. Thus, a conversion is effected to Fsc, which is 3.576 MHz for signals in accordance with the NTSC standard.

A first mixing signal is applied to the first mixer 1, which is subjected to a phase shift of 90 degrees by a first phase shifter 6 at the beginning of each picture line. Thus, at the beginning of each picture line, the first phase shifter produces an additional phase shift of 90 degrees. Likewise, the mixing signal applied to the second mixer 5 is given the same phase shift but with an opposite sign by means of a second phase shifter 7. In this way, it is achieved that the signal applied to the comb filter circuit is such that, in each picture line, the color carrier waves appear with the same phase relationship. Thus, the color carrier waves are filtered in-phase in the comb filter circuit, as a result of which, an optimum filtering is achieved.

Since the phase shifts could give rise to problems during reproduction, they are canceled by means of the second phase shifter 7 and the second mixer 5. This does not impair the optimum comb filtering.

The frequencies required for the mixing signals are derived from a quartz oscillator 8, which supplies a frequency Fsc, i.e., the frequency which the color carrier wave on the output of the second mixer 5 should have.

After multiplication by a factor of two by means of a multiplier 9, the output signal of the quartz oscillator 8 is used for clocking the two delay elements 2 and 3 of the comb filter circuit.

Moreover, after division by a factor of four by a divider 10, the output signal of the multiplier 9 is used as the second mixing signal, which is applied to the second phase shifter 7.

The output signal of the divider 10 is further applied to a phase comparator 11, which, in addition, also receives the output signal of the first mixer or the output signal of the comb filter circuit. Switching between these two signals is effected by means of a switch 12.

In each case, the phase shifter thus receives a signal of the frequency ½ Fsc on both inputs. One of the signals has been derived from the quartz oscillator 8 and the other signal exhibits the frequency of the reproduced color signal, i.e., of its carrier wave. From the phase shifts of these two signals, the phase comparator 11 generates a control signal by means of which a voltage-controlled oscillator 14 is controlled.

The voltage-controlled oscillator 14 operates with a nominal frequency of 4×(½ Fsc+40 Fh). By means of a divider 13 arranged after the voltage-controlled oscillator 14, this frequency is reduced to a quarter of this value, i.e., to the value ½ Fsc+40 Fh.

This signal is applied to the first phase shifter 6 as the first mixing signal, which, in turn, applies this signal to the first mixer 1 with the previously mentioned phase shifts. Due to the selected frequency ½ Fsc+40 Fh, beating with the signal of the frequency 40 Fh, as obtained from the record carrier, results in a conversion to the frequency ½ Fsc.

Controlling the voltage-controlled oscillator 14 with the output signal of the phase comparator 11, in addition, results in an adaptation of the first mixing signal to phase shifts of the color carrier frequency which may occur in the reproduced signal. For the comparison, it is possible to choose between the output signal of the first mixer and the output signal of the comb filter circuit by changing over the switch 12. This means that always input signals with small crosstalk components can be used for the phase comparison. For example, if the input signal contains substantial crosstalk components, for example, in the long-play mode, interference suppression by means of the comb filter is necessary. However, in the normal mode with smaller crosstalk components, it is advantageous if the signal for the phase comparator is taken off before the comb filter in view of the control times.

By means of the circuit arrangement shown in FIG. 1, it is altogether achieved that at the beginning of each picture line the mixing signal is, each time, shifted by 90 degrees by means of the phase shifter 6. As a result, the input signal to the comb filter circuit exhibits the same phase for each picture line, i.e., particularly the color carrier waves always appear with the same phase relationship. Thus, the color carrier waves at the outputs of the two delay elements 2 and 3 can also be combined with a correct phase relationship in the summing stage 4. By means of the second phase shifter 7 and the second mixer stage, the applied phase shifts are canceled, so that the output signal no longer exhibits any phase shifts but is nevertheless comb-filtered in an optimum manner.

Depending on the recording standard, various phase shifts of the color signal have been provided in order to reduce cross-talk effects on the tape. It is then requires that these tape-recorded phase shifts be cancelled. To that end, the first phase shifter 6 additionally phase shifts the first mixing signal by a predetermined amount to compensate for these tape-recorded phase shifts. As such, the first mixer 1, in addition to phase shifting the color signal by 90 degrees each picture line, also phase shifts the color signal to compensate for the tape-recorded phase shifts.

The values chosen in the present example apply to a color signal in accordance with the NTSC standard. For a color signal in accordance with the PAL standard, a phase shift of 90 degrees would be introduced at the beginning of every second picture line.

What is claimed is:

1. A circuit arrangement for processing a color signal modulated on a carrier wave having a first carrier frequency, the circuit arrangement comprising:

first mixing means having a first input for receiving the color signal modulated on the carrier wave having the first carrier frequency, and a second input for receiving a first mixing signal, said first mixing means converting the first carrier frequency of the carrier wave to a second carrier frequency, and providing the color signal modulated on the carrier wave with the second carrier frequency as an output signal;

a comb filter circuit coupled to receive the output signal of the first mixing means, said comb filter circuit providing a comb-filtered output signal;

second mixing means having a first input for receiving the comb-filtered output signal, and a second input for receiving a second mixing signal, said second mixing means converting the second carrier frequency of the carrier wave of the comb-filtered output signal to a third carrier frequency;

first phase shifting means for subjecting the first mixing signal to a phase shift of a given magnitude after a given number of picture lines of the color signal, the phase shift being, each time, effected in addition to any previously applied phase shifts, and being selected to compensate for a non-integral ratio between a period of one picture line and a period of the color signal modulated on the carrier wave at the first carrier frequency, in such a manner that a period of the carrier wave on the input of the comb filter circuit begins at a beginning of a next picture line; and second phase shifting means for subjecting the second mixing signal to a phase shift of the same magnitude but of opposite sign and at the same instant as the phase shift performed by the first phase shifting means.

2. The circuit arrangement as claimed in claim 1, in which the period of the carrier wave associated with a given pixel of the picture line, begins at the beginning of the next picture line.

3. The circuit arrangement as claimed in claim 1, in which the phase shifts of the first and second phase shifting means are effected during time intervals in which the picture lines have no picture content.

4. The circuit arrangement as claimed in claim 1, in which the phase shifts of the first and second phase shifting means are effected during horizontal synchronization pulses present in the picture lines.

5. The circuit arrangement as claimed in claim 1, in which, for processing the color signal in accordance with an NTSC standard available in a color-under frequency mode, the first phase shifting means shifts the phase of the first mixing signal by substantially +90 degrees after every picture line, and the second phase shifting means shifts the phase of the second mixing signal by substantially −90 degrees after the same picture lines.

6. The circuit arrangement as claimed in claim 1, in which, for processing the color signal in accordance with a PAL standard available in a color-under frequency mode, the first phase shifting means shifts the phase of the first mixing signal by substantially +90 degrees after every second picture line, and the second phase shifting means shifts the phase of the second mixing signal by substantially −90 degrees after the same picture lines.

7. The circuit arrangement as claimed in claim 1, in which the color signal as supplied to the circuit arrangement was reproduced from a recording medium, and the first phase shifting means is used, in addition, for canceling phase shifts of the color signal introduced when said color signal was recorded on said recording medium.

8. The circuit arrangement as claimed in claim 1, in which the third carrier frequency is in accordance with a color signal standard.

* * * * *